United States Patent [19]

Ross et al.

[11] 3,958,077

[45] May 18, 1976

[54] PICTURE TRANSMISSION SYSTEMS

[75] Inventors: John Ross, Claremont; Amedeo Filiberto Sala-Spini, Morley, both of Australia

[73] Assignee: The University of Western Australia, Nedlands, Australia

[22] Filed: Oct. 31, 1974

[21] Appl. No.: 519,695

[30] Foreign Application Priority Data
Oct. 31, 1973 Australia.............................. 5483/73

[52] U.S. Cl............................. 178/6; 178/DIG. 3; 178/DIG. 24
[51] Int. Cl.².......................................... H04N 3/30
[58] Field of Search............... 178/DIG. 3, DIG. 24, 178/6, 6.8

[56] References Cited
UNITED STATES PATENTS

| | | | |
|---|---|---|---|
| 2,960,566 | 11/1960 | Athey .......................... | 178/DIG. 24 |
| 3,196,207 | 7/1965 | Davies ......................... | 178/DIG. 24 |
| 3,272,918 | 9/1966 | Koll ................................. | 178/6.6 A |
| 3,309,461 | 3/1967 | Deutsch......................... | 178/DIG. 3 |
| 3,622,697 | 11/1971 | Metzger............................... | 178/7.7 |
| 3,769,452 | 10/1973 | Stone............................ | 178/DIG. 3 |

*Primary Examiner*—Howard W. Britton
*Assistant Examiner*—Michael A. Masinick
*Attorney, Agent, or Firm*—D. Paul Weaver

[57] ABSTRACT

In a television or other picture transmission the picture is scanned in a random or pseudo-random manner enabling picture analysis and transmission within band widths considerably smaller than with conventional sequential lexicographic scans with elimination of flicker. The random scan is obtained in the X and Y directions by employing two shift registers connected serially with random bit numbers entered into the first register. The coordinates of the scanning spot are determined by the instantaneous content in the shift registers. Similar serially connected shift registers are used at the receiver, and the random bits, which are transmitted along with the video signal, are applied to the first of them. After a short period the receiver will be in synchrony with the transmitter no matter what the original content of the registers at the receiver. Conversion to a random or pseudo-random scan may be used as a step in changing from one television standard to another.

6 Claims, 6 Drawing Figures

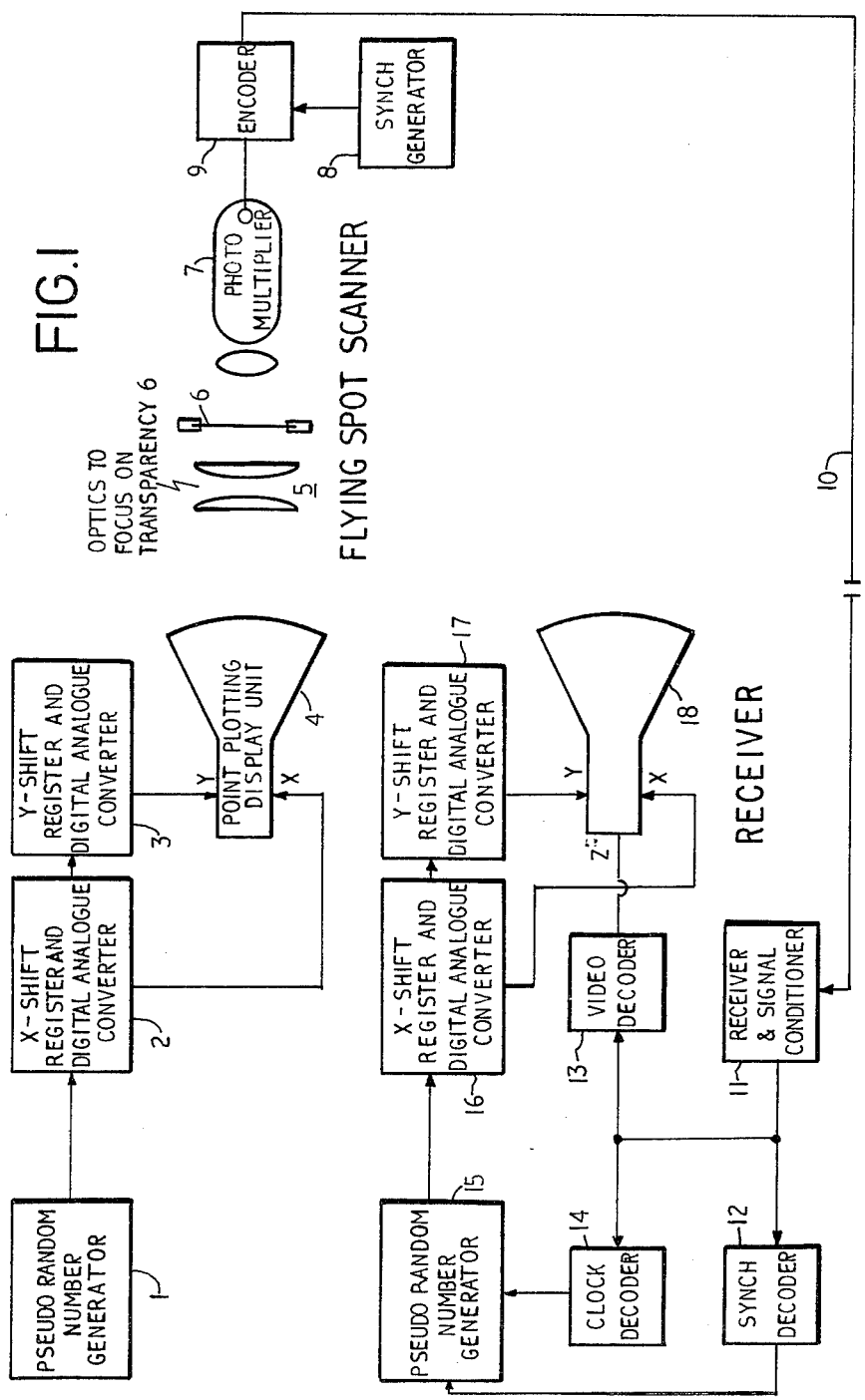

PICTURE TRANSMISSION SYSTEMS

BACKGROUND OF THE INVENTION

This invention relates to picture transmission systems. It has particular applicability to television systems, both closed circuit and broadcast television, but it is also applicable to facsimile systems, monitoring systems, and data transmission systems.

Current television techniques are based on a sequential lexicographic scan in which a sequence of horizontal lines is swept out point by point, with some interlacing to minimise flicker. The standard frame rate in Australia is 25 frames per second interlaced, which means, given the line structure, that a band width of approximately 5 MHz is required for acceptable transmission. Some minor improvement in band width is possible with refinements in picture encoding techniques, but even with these refinements the band width required runs well into the MHz range. If the scanning rate is decreased so as to permit transmission within a narrower band width, picture quality is adversely affected and there is severe flicker.

We believe that the difficulty in decreasing band width is due to the response of the visual system to systematic and, particularly, to linear scan patterns. We have found that picture analysis and transmission within band widths below 1 MHz with elimination of flicker can be achieved by scanning the picture in a random scan, or a pseudo-random scan.

The fact that use of a pseudo random scan makes possible a narrow-band transmission providing pictures of good entertainment value and high usable information content has previously been recognized.

Similar benefits are obtained with a random or pseudo-random scan in facsimile systems and other picture transmission systems.

However no prior picture transmission system has been described which enables a true random scan to be used — in all cases a pseudo random scan has to be employed. In all cases the pseudo random scan is within a frame, or fields forming a frame, and synchronising signals must be transmitted along with the luminance signal in order to provide a reference by which the pseudo random generator is periodically reset to a standard value from which it steps along in synchronism with the generator at the transmitter.

SUMMARY OF THE INVENTION

An object of the present invention is to provide a picture transmission system in which no synchronising signals are required to be transmitted between the transmitter and receiver.

Another object of the invention is to provide a picture transmission system in which the scan can be a true random scan.

Another object of this invention is to provide a picture transmission system in which, after a short time interval, the scanning means or the like at the transmitter and receiver will automatically track with each other without any need for the transmission of synchronising signals.

If a pseudo random scan is employed the scan source can be shift registers generating a system of pseudo random numbers. The technology for the pseudo random number generation using digital shift registers is well established and cheap. The clocking of the shift registers can be derived from the video information without any extra cost in band width.

BRIEF DESCRIPTION OF THE DRAWINGS

FIG. 1 is a block diagram of a television system which is illustrative of the state of the art and in which pseudo random number generators are used.

DESCRIPTION OF THE PREFERRED EMBODIMENT

Figure 2A:
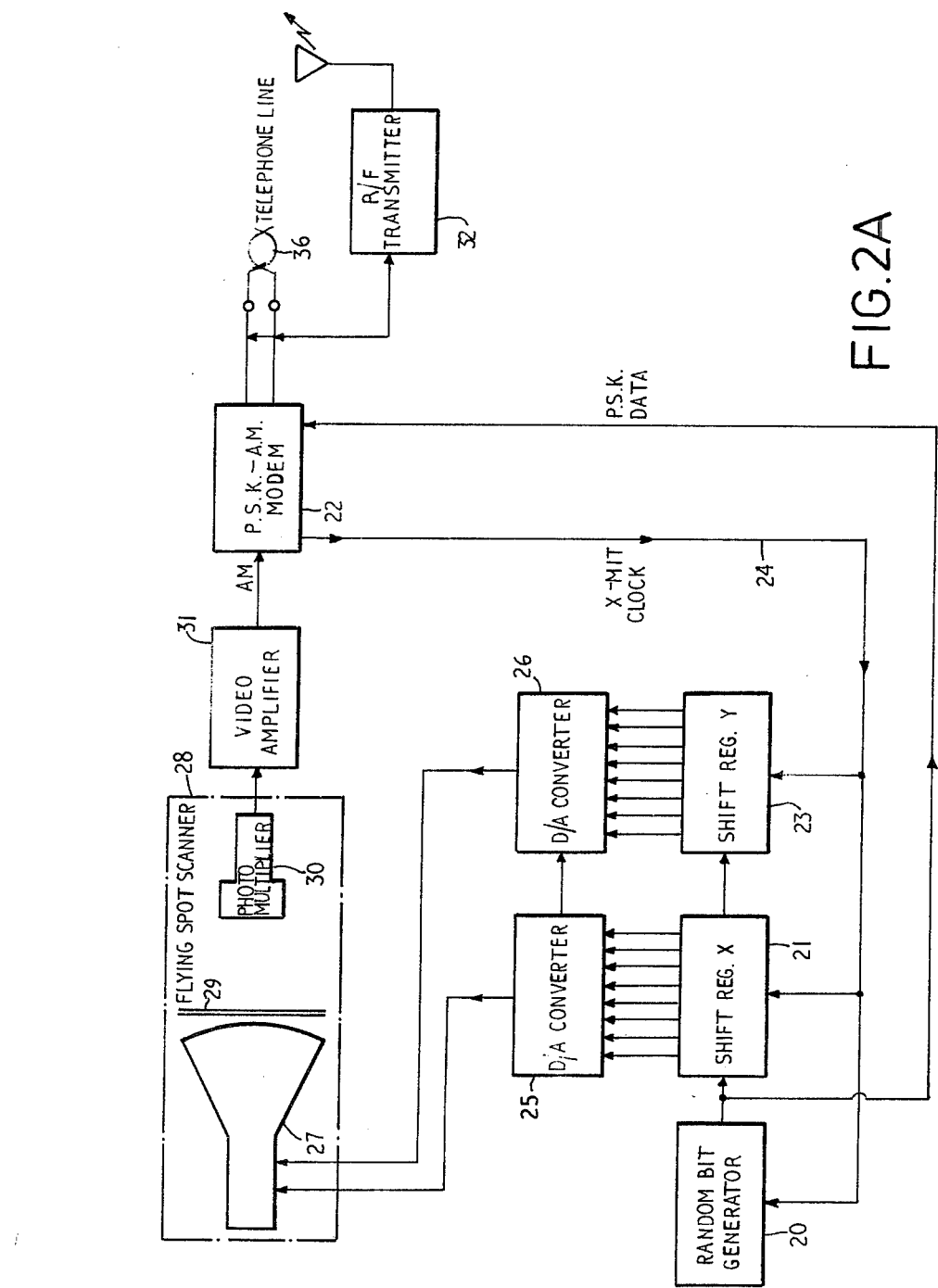
FIG. 2A is a block diagram of a modified television transmitter in accordance with this invention.

Referring now to FIG. 1, pseudo-random number generator 1 is a commercially available shift register device which gives as its output a stream of pseudo-random binary digits. This output is applied to both an X-shift register and digital to analogue converter 2 and an identical Y-shift register and digital to analogue converter 3. These registers accept, for example, eight or more random binary digits, and produce an analogue signal corresponding to the numerical value in the shift register. The X and Y outputs from 2 and 3 are applied to a standard point plotting display unit 4, forming part of a flying spot scanner, so as to display a point with the coordinates specified by the pseudo-random number output. Suitable optics 5 is provided to focus the spot on the transparency 6 to be transmitted, and the light passing through the transparency falls upon a photo-multiplier 7. The output from the photo-multiplier is combined with the output from the synch generator 8 in a video and synch encoder 9. The synch generator 8 is of the type used in data transmission. The encoder 9 is a conventional video amplifier.

The output from encoder 9 is transmitted over any suitable medium 10 to a receiver, where the received signals are applied to a receiver and signal conditioner 11 which is a conventional video receiver and signal converter for the reception of D.C. levels and clamping.

The output from signal conditioner 11 is applied to each of the synch decoder 12, video decoder 13, and clock decoder 14. The synch decoder and clock decoder respectively extract synch and clock information from the signal, while the video decoder extracts video information. The outputs from the synch and clock decoders 12, 14 are applied to a pseudo-random number generator 15 identical with that numbered 1 at the transmitter, and which produces a stream of pseudo-random numbers in digital form identical with that produced by number generator 1. The output from generator 15 is applied to X and Y shift registers and digital to analogue converters 16, 17 in the same manner as at the transmitter, and the resulting signals are applied to the X and Y deflecting electrodes of a standard point plotting display unit 18.

Since the scan is a random or pseudo random one, it is non-repetitive, and therefore there is no frame or frame rate. There is no point of discontinuity within the scan pattern, as there is in normal television when that scan returns to start, and therefore there is no frame or frame rate at which flicker might be produced.

Scanning in the system of FIG. 1 is effected by a flying spot scanner. Electrostatic deflection can be used in the display unit 4 so that the beam can be deflected sufficiently quickly from any point in the picture to any other point which is a requirement of a random or pseudo random scan. Cameras using magnetic deflection, such as the image orthicon or vidocon, are not suitable for television broadcasting because of their slow scan rate limitations. They could, however, be used in applications where a slow scan rate would not be a limitation. Also solid state television cameras can be used where their resolution is sufficient for a particular application. The television system just described requires the transmission of synchronising signals and is illustrative of the art.

In the television transmitter shown in FIG. 2A, which illustrates the present invention, the output from a random bit generator 20 is applied to series-in/parallel-out X shift register 21 and simultaneously to a P.S.K. — AM (phase shift keying - amplitude modulation) modem 22. The output from the X shift register 21 is applied to the input of the Y shift register 23. Clock signals, which may be generated in the modem 22, are applied by way of line 24 to the shift registers and the random bit generator. The shift registers 21, 23 may, for example, be type 74164. The modem 22 may be a DELTEC type TTB-2. The random outputs from the shift registers 21 and 23 are applied respectively to the digital-analog converters 25, 26 to produce an analog signal corresponding to the current contents of the X and Y shift registers 21, 23. The X and Y outputs from 25, 26 are applied to a standard point plotting display unit 27 forming part of a typical flying spot scanning system 28. A transparency being scanned is represented by 29. The output from the photomultiplier 30 is amplified in the video amplifier 31, and then applied to the modem encoder 22. The output from the modem encoder is applied to any transmitting system such as an R.F. transmitter 32.

Figure 2B:
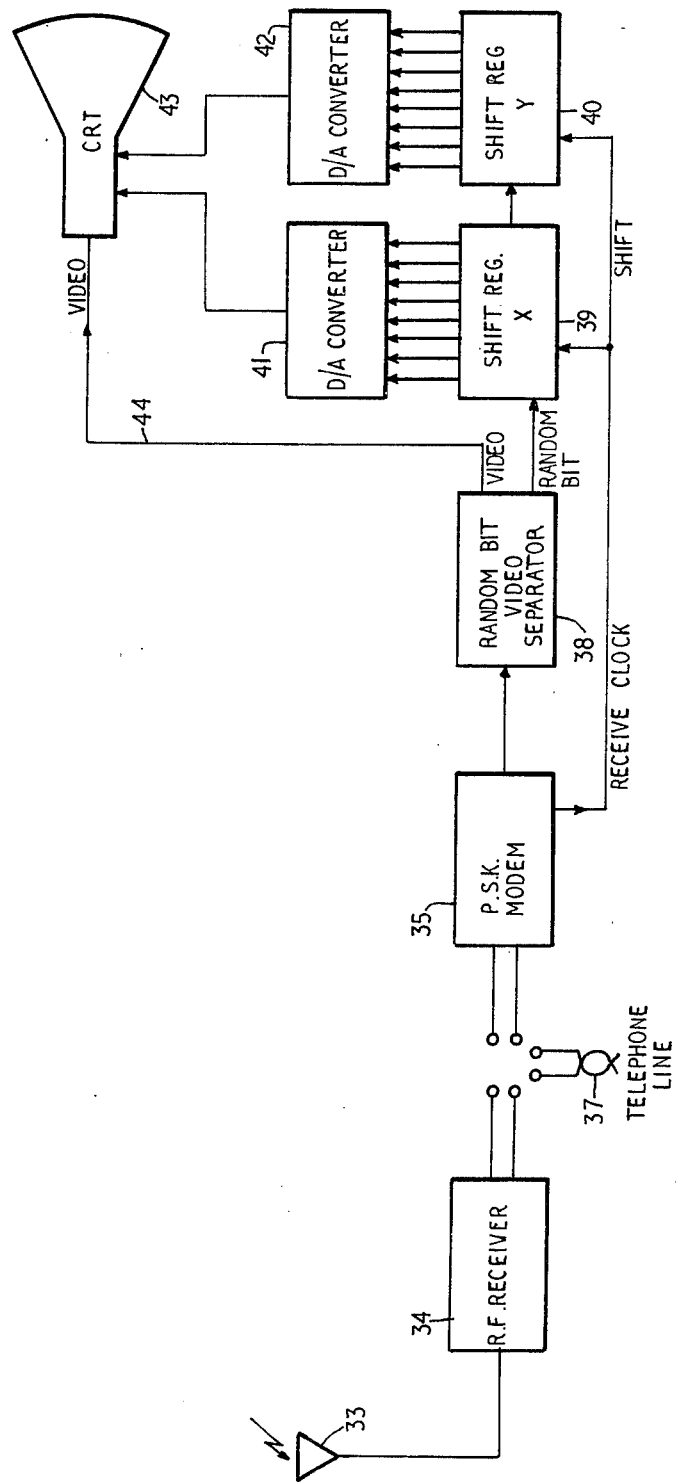
FIG. 2B is a block diagram of a receiver for use with the transmitter of FIG. 2A.

Referring now to FIG. 2B, the transmitted signal is received by antenna 33, and amplified in the receiver 34, whose output is applied to the P.S.K.—A.M. modem 35, similar to the modem 22 of FIG. 2A, where the signal is decoded. Alternatively a solid line may be used between the transmitter and receiver as suggested by the telephone jacks 36, 37. Random bit information is separated from the video information by the random bit-video separator 38. The random bit information from 38 is applied to the X shift register 39, the least significant bit being passed on to the Y shift register 40 as in the same way as in the transmitter. Again, as in the transmitter, the contents in the shift registers 39, 40 are converted to analog signals by any suitable digital to analog converters 41, 42 to determine the point to be displayed on a suitable point plotting oscilloscope 43 such as a Tektronix Type 602. Video information for each bit is provided from the separator 38 by way of line 44. Clock signals are decoded by the modem 35 and applied to the shift registers 39, 40.

The system just described is in effect self-tracking. The coordinates for each point are determined by the current contents of the X and Y shift registers. The coordinates for the next point are those determined by shifting the complete contents of the X and Y shift registers one place to the right, losing the least significant bit in the Y register and injecting a random bit to the left or most significant location in the X register. Since the same sequence of shifts occurs at the receiving end in response to the data transmitted, the receiving end tracks with the transmitting end after a predetermined number of shifts - sixteen shifts in the case where the shift registers 21, 23 and 39, 40 are each two eight-bit registers in series. This means that the receiving end can pick up transmission at any stage without the necessity for a synchronising signal. It also means that any loss of tracking is automatically corrected, after sixteen shifts have occurred in the example being considered. Since no synchronisation is necessary the random scan pattern can be driven by either a purely random or a pseudo-random generator. Experiments have shown that the technique of generating random point coordinates by shifting a bit stream through two registers as described is perceptually indistinguishable from completely replenishing the contents of each register with new eight-bit, in the exemplary case, random numbers. Framing of the picture is completely eliminated, which therefore eliminates the need for synchronisation and sequence initialisation.

The scanning process just described is frame free and therefore immune to hum. Line and frame techniques must be driven at a frequency to avoid hum. Even random scanning procedures which scan at random within a frame encounter hum problems. Only an element by element scan which is completely frame free, as in the present invention, can avoid the problem.

Figure 3:
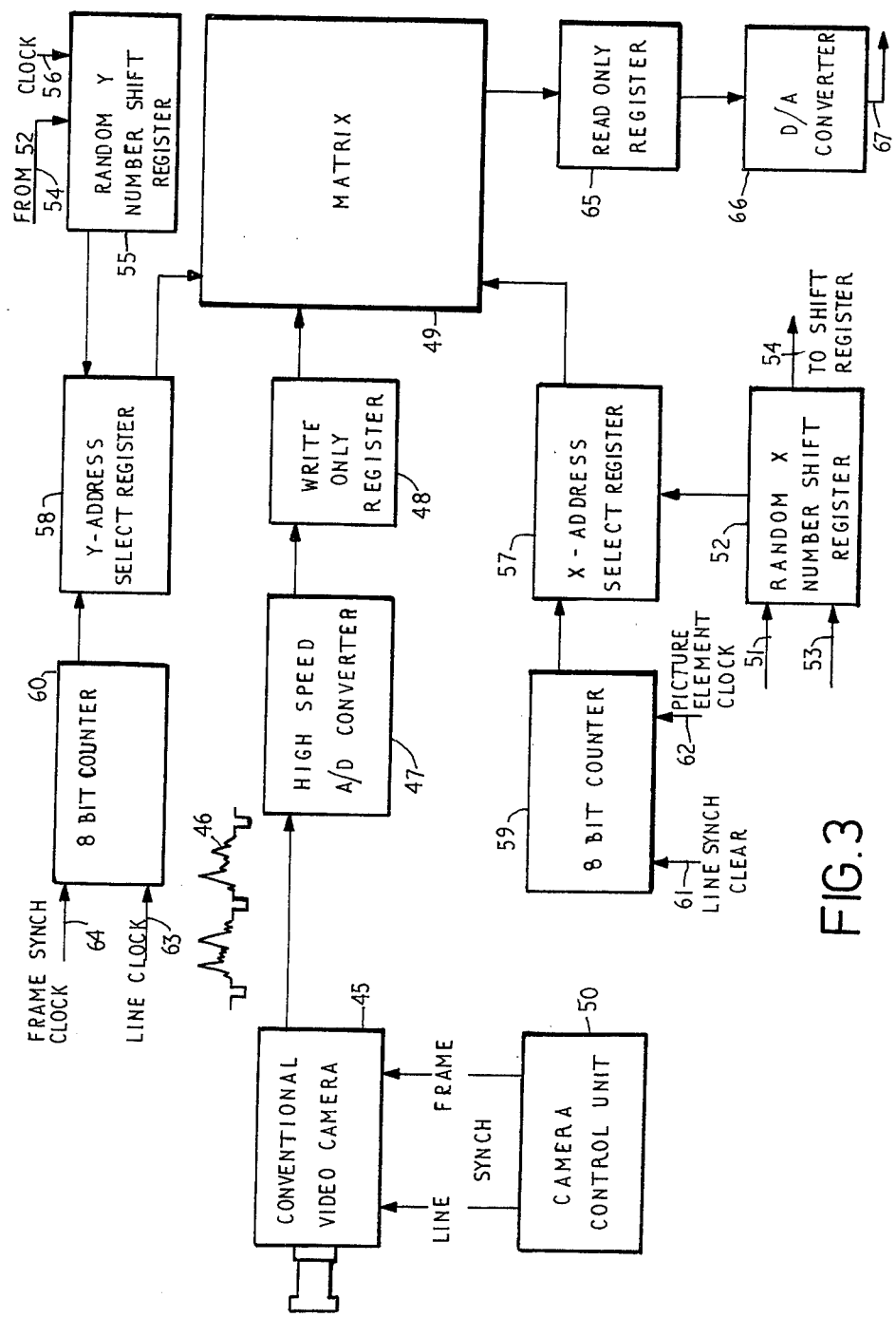
FIG. 3 is a block diagram of a scan converter for converting sequential scanning to random scanning in accordance with this invention.

FIG. 3 shows a scan converter for converting sequential scanning to random scanning. Such a converter can replace the flying spot scanners shown in FIGS. 1 and 2A when any conventional video scanner 45 is used. The composite video signal shown diagrammatically at 46 is applied to a 3-bit high speed analog-digital converter 47 whose output is applied to a write only register 48. The output from register 48 is applied to a three-dimensional 246 × 256 × 3 matrix 49 being a solid-state memory. A camera control unit 50 provides line and frame synchronising information for camera 45.

Random bits from a random bit generator (not shown) are applied by way of line 51 to a random X-number shift register 52, clock signals being applied by way of line 53. The least significant bit from 52 is applied by way of line 54 to a random Y-number shift register 55 to which clock pulses are also applied by way of line 56.

X and Y address select registers 57, 58 respectively are provided to which the outputs from the random number shift registers 52, 55 respectively are applied. Also the outputs from the 8-bit counters 59, 60 are applied to address select registers 57, 58 respectively.

Line synch clear pulses are applied to the counter 59 by line 61 and picture element clock pulses are applied by line 62. Line clock pulses are applied to counter 60 by way of line 63 and frame synch clock pulses by way of line 64. The outputs from the X and Y address select registers 57, 58 are also applied to the matrix 49. The output from matrix 49 is applied to the read only register 65 whose output in turn is applied to a digital-/analog converter 66. The desired video output signal in analog form is obtained at 67. It can be applied to the modem 22 of FIG. 2A.

Figure 4:
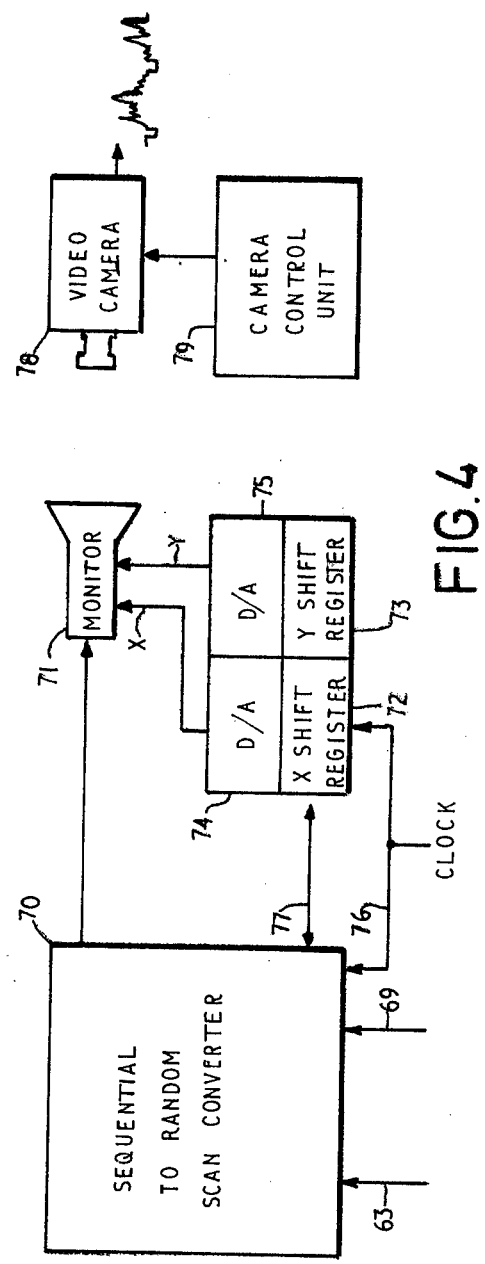
FIG. 4 is a block diagram of a video standards converter.

FIG. 4 shows how the invention can be used to transform a television signal according to one sequential scanning standard to another. The video and synch signals at 68, 69 according to the first standard are applied to a sequential to random scan converter 70 such as is shown in FIG. 3. The random scan video output is applied to the high speed electrostatic deflection monitor 71. Serially connected X and Y shift registers 72, 73 connected to digital/analog converters 74, 75 are provided as in the case of FIG. 2A. Clock pulses are applied to the registers via line 76 and random access pulses are applied to converter 70 and X shift register 72 by way of line 77. The picture appearing on the face of monitor 71 is observed by any standard video camera 78 controlled by camera control unit 79 according to a second standard.

One application of the invention is time multiplexing of several video channels onto a single video channel. Because of the band width advantages of the system, a simple transmitter can service several peripheral transmitters which would convert the information they receive to any television standard, including the current linear scan. The remote display can be translated through a vidicon camera tube as just described. This is possible because of the storage capabilities of the vidicon camera. Since the scan pattern transmitted from the central transmitter is without line structure the problems normally associated with conversion from one line standard to another do not arise.

Figure 5:
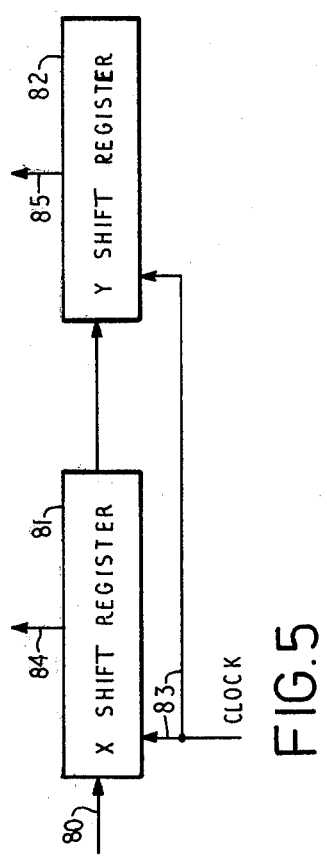
FIG. 5 is a block diagram of a random scan synchronisation network.

FIG. 5 shows random scan (including pseudo scan) synchronisation. The received random bit is applied at 80 to the X shift register 81 whose lowest significant figure is transferred to the Y shift register 82 at the same time. Clock pulses are applied by line 83. The outputs are applied to digital/analog converters (not shown) as before by lines 84, 85.

An advantage of the system of the invention is that it offers a natural way of providing secrecy protection. Since transmitter and receiver must follow the same scan path security within closed networks can be provided by employing secure scan generators. This would amount to nothing more than a secure initial setting within the shift registers that drive the scans for the transmitters and receivers. A natural application is for data transmission within computer networks where security is required.

Another application for the invention is to provide narrow band width radar display over radio channels such as ship-to-shore radio and airborne communication. The random scan display provides an immediate perceptual appreciation of the relative location of objects of interest and of their motion relative to one another.

A further application is in the field of data transmission for the purpose of visual display. Since the scan is on a dot by dot basis, character transmission is not confined to any preset format, such as that proscribed by the ASCII code and associated character generation. By concentrating the scan within subregions of a display, high quality imaging can be achieved at 9.6 kilobits, without local storage, and without the requirement of protecting transmission by error detection codes. Exotic character sets, for example Japanese characters or arbitrary graphics, together with complex background information, could be transmitted as easily as standard character sets.

What we claim is:

1. In a picture transmission system in which every picture element is considered to be addressable in an X-Y plane and the picture is scanned according to X and Y coordinate values specifying the address of a scanning means, means for scanning the picture in a random manner comprising an X shift register and a Y shift register connected serially, a random bit generator, means for shifting each random bit as it is received from the random bit generator into the most significant position of the X register, means to shift all previous bits in both registers one position to the right in such a way that
    a. the bit previously in the most significant position of the X register moves to the next most sigificant position,
    b. the bit in the least significant position within the X register moves to the most significant position of the Y register,
    c. the bit in the least significant position of the Y register is discarded, and
    d. all other bits shift to the next position to the right, thereby becoming less significant,
means to position the scanning means according to the address defined by the contents of the X and Y shift registers, means to encode the luminance values of the picture element at the position defined by the current contents of the X and Y shift registers, and means for transmitting each bit output of the random bit generator along with the said luminance values.

2. In a picture transmission system as claimed in claim 1, means at a receiver for separating the luminance values of picture elements from the random bit signals, an X shift register and a Y shift register connected serially, means for applying the random bits to the X shift register at the receiver in the same manner as it is applied to the X shift register at the transmitter, and shifting bits in both the X and Y registers at the receiver in the same manner as at the transmitter, a display means, means to position the tracing means of the display means according to the address defined by the current contents of the X and Y registers at the receiver, and means for displaying luminance values for the picture elements.

3. A picture transmission system comprising means for scanning a picture in a sequential lexicographic scan to generate a picture signal, means for converting the picture signal into digital form, means for writing the digital information into a matrix considered to be addressable in an X-Y plane, means for reading out from the matrix in a random manner comprising an X shift register and a Y shift register connected serially, a random bit generator, means for shifting each random bit as it is received from the random bit generator into the most significant position of the X register, means to shift all previous bits in both registers one position to the right in such a way that
    a. the bit previously in the most significant position of the X register moves to the next most significant position of the Y register,
    b. the bit in the least significant position within the X register moves to the most significant position of the Y register,
    c. the bit in the least significant position of the Y register is discarded, and
    d. all other bits shift to the next position to the right, thereby becoming less significant,
means for reading out the luminance values in digital value at the address in the matrix defined by the contents of the X and Y shift registers, means for encoding the luminance values and means for transmitting each bit output generated by the random bit generator along with the encoded luminance values.

4. In a picture transmission system in which every picture element is considered to be addressable in an X-Y plane and the picture is scanned according to X and Y coordinate values specifying the address of a scanning means, means for scanning the picture in a pseudo random manner comprising an X shift register and a Y shift register connected serially, a pseudo random bit generator, means for shifting each pseudo random bit as it is received from the pseudo random bit generator into the most significant position of the X register, means to shift all previous bits in both registers one position to the right in such a way that
 a. the bit previously in the most significant position of the X register moves to the next most significant position,
 b. the bit in the least significant position within the X register moves to the most significant position of the Y register,
 c. the bit in the least significant position of the Y register is discarded, and
 d. all other bits shift to the next position to the right, thereby becoming less significant,
means to position the scanning means according to the address defined by the contents of the X and Y shift registers, means to encode the luminance values of the picture element at the position defined by the current contents of the X and Y shift registers, and means for transmitting each bit output of the pseudo random bit generator along with the said luminance values.

5. In a picture transmission system as claimed in claim 4, means at a receiver for separating the luminance values of picture elements from the pseudo random bit signals, an X shift register and a Y shift register connected serially, means for applying the pseudo random bits to the X shift register at the receiver in the same manner as it is applied to the X shift register at the transmitter, and shifting bits in both the X and Y registers at the receiver in the same manner as at the transmitter, a display means, means to position the tracing means of the display means according to the address defined by the current contents of the X and Y registers at the receiver, and means for displaying luminance values for the picture elements.

6. A picture transmission system comprising means for scanning a picture in a sequential lexicographic scan to generate a picture signal, means for converting the picture signal into digital from, means for writing the digital information into a matrix considered to be addressable in an X-Y plane, means for reading out from the matrix in a pseudo random manner comprising an X shift register and a Y shift register connected serially, a pseudo random bit generator, means for shifting each pseudo random bit as it is received from the pseudo random bit generator into the most significant position of the X register, means to shift all previous bits in both registers one position to the right in such a way that
 a. the bit previously in the most significant position of the X register moves to the next most significant position of the Y register,
 b. the bit in the least significant position within the X register moves to the most significant position of the Y register,
 c. the bit in the least significant position of the Y register is discarded, and
 d. all other bits shift to the next position to the right, thereby becoming less significant,
means for reading out the luminance values in digital value at the address in the matrix defined by the contents of the X and Y shift registers, means to encode the luminance values of the picture element at the position defined by the contents of the X and Y shift registers, and means for transmitting each bit output of the pseudo random bit generator along with the encoded luminance values.

* * * * *